United States Patent
Uenishi

(10) Patent No.: US 9,654,653 B2
(45) Date of Patent: May 16, 2017

(54) DISPLAY DEVICE, IMAGE FORMING APPARATUS, AND DISPLAY METHOD

(71) Applicant: KYOCERA Document Solutions Inc., Osaka (JP)

(72) Inventor: Hiroyuki Uenishi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 14/958,136

(22) Filed: Dec. 3, 2015

(65) Prior Publication Data

US 2016/0182749 A1    Jun. 23, 2016

(30) Foreign Application Priority Data

Dec. 22, 2014 (JP) .................. 2014-259164

(51) Int. Cl.
| | |
|---|---|
| *H04N 1/00* | (2006.01) |
| *G06K 9/00* | (2006.01) |
| *G06F 3/0488* | (2013.01) |
| *G06F 3/0484* | (2013.01) |

(52) U.S. Cl.
CPC ..... *H04N 1/00424* (2013.01); *G06F 3/04842* (2013.01); *G06F 3/04883* (2013.01); *G06F 3/04886* (2013.01); *G06K 9/00429* (2013.01); *G06K 9/00456* (2013.01);
(Continued)

(58) Field of Classification Search
None
See application file for complete search history.

(56) References Cited

U.S. PATENT DOCUMENTS

| | | | | |
|---|---|---|---|---|
| 9,361,019 | B2* | 6/2016 | Noh | ............ G06F 3/04883 |
| 2007/0259716 | A1* | 11/2007 | Mattice | ............ G06F 3/013 |
| | | | | 463/36 |

(Continued)

FOREIGN PATENT DOCUMENTS

| | | |
|---|---|---|
| JP | H11-282595 A | 10/1999 |
| JP | 2012-032890 A | 2/2012 |
| JP | 2013-125488 A | 6/2013 |

OTHER PUBLICATIONS

An Office Action; "Notice of Reasons for Rejection," issued by the Japanese Patent Office on Aug. 9, 2016, which corresponds to Japanese Patent Application No. 2014-259164 and is related to U.S. Appl. No. 14/958,136.

*Primary Examiner* — Ted Barnes
(74) *Attorney, Agent, or Firm* — Studebaker & Brackett PC

(57) ABSTRACT

A control section includes a track detecting section, a pattern determining section, and a character string display section. The track detecting section detects a track of a touch point on a touch panel by a user. The pattern determining section determines whether or not there is a match between the track of the touch point detected by the track detecting section and any of a plurality of patterns stored by a storage section. Upon the pattern determining section determining that there is a match, the character string display section reads a character string from the storage section that is associated with a pattern determined to match the track of the touch point from among the plurality of patterns. The character string display section causes pasting and display of the character string in an input region displayed by a display section.

10 Claims, 9 Drawing Sheets

(52) U.S. Cl.
CPC ... *H04N 1/00411* (2013.01); *G06K 2209/011* (2013.01); *H04N 2201/0094* (2013.01)

(56) References Cited

U.S. PATENT DOCUMENTS

| | | | | |
|---|---|---|---|---|
| 2011/0034208 A1* | 2/2011 | Gu | G06F 3/04883 | 455/550.1 |
| 2011/0179381 A1* | 7/2011 | King | G06F 3/04883 | 715/786 |
| 2012/0240025 A1* | 9/2012 | Migos | G06F 3/0488 | 715/230 |
| 2012/0262403 A1* | 10/2012 | Tissot | B60K 35/00 | 345/173 |
| 2013/0120280 A1* | 5/2013 | Kukulski | G06F 3/04883 | 345/173 |
| 2013/0339909 A1* | 12/2013 | Ha | G06F 3/017 | 715/863 |
| 2014/0040831 A1* | 2/2014 | Akasaka | G06F 3/04883 | 715/841 |
| 2014/0071054 A1* | 3/2014 | Koch | G06F 3/0488 | 345/168 |
| 2014/0143688 A1* | 5/2014 | Hou | G06F 3/0488 | 715/760 |
| 2014/0155162 A1* | 6/2014 | Mattice | G06F 3/013 | 463/31 |
| 2014/0282214 A1* | 9/2014 | Shirzadi | G06F 3/04883 | 715/781 |
| 2014/0298672 A1* | 10/2014 | Straker | H04W 12/06 | 34/175 |
| 2014/0320420 A1* | 10/2014 | Ida | G06F 3/044 | 345/173 |
| 2014/0331175 A1* | 11/2014 | Mesguich Havilio | G06F 3/04883 | 715/808 |
| 2014/0351753 A1* | 11/2014 | Shin | G06F 3/0488 | 715/810 |
| 2014/0354564 A1* | 12/2014 | Park | G06F 3/041 | 345/173 |
| 2015/0026620 A1* | 1/2015 | Kwon | G06F 3/04845 | 715/770 |
| 2015/0074575 A1* | 3/2015 | Jeon | G06F 3/04886 | 715/768 |
| 2015/0127681 A1* | 5/2015 | Lee | G06F 3/04883 | 707/772 |
| 2015/0156352 A1* | 6/2015 | Ichiyama | H04N 1/00392 | 358/1.15 |
| 2015/0185871 A1* | 7/2015 | Jeong | G06F 3/038 | 345/158 |
| 2015/0253891 A1* | 9/2015 | Westerman | G06F 3/03547 | 345/173 |
| 2016/0027155 A1* | 1/2016 | Naruse | H04N 1/409 | 382/167 |
| 2016/0299680 A1* | 10/2016 | Polyulya | G06F 3/0488 | |
| 2016/0320888 A1* | 11/2016 | Yipu | G06F 3/0412 | |

* cited by examiner

DISPLAY DEVICE, IMAGE FORMING APPARATUS, AND DISPLAY METHOD

INCORPORATION BY REFERENCE

The present application claims priority under 35 U.S.C. §119 to Japanese Patent Application No. 2014-259164, filed on Dec. 22, 2014. The contents of this application are incorporated herein by reference in their entirety.

BACKGROUND

The present disclosure relates to a display device including a touch panel, an image forming apparatus, and a display method.

In recent years, various devices have been proposed that copy and paste text or images. In one example, a known input device displays copied data on a display section based on a pressing pattern. More specifically, the input device detects a pressing pattern based on pressing load and, in a situation in which there are a plurality of pieces of copied data for pasting, displays copied data corresponding to the detected pressing pattern on the display section.

According to the input device described above, a control section causes the display section to display one of the pieces of copied data based on the pressing pattern and, as a result, copying and pasting of a plurality of pieces of text, images, and so forth can be easily performed.

SUMMARY

A display device according to a first aspect of the present disclosure includes a display section, a storage section, and a control section. The display section includes a touch panel. The storage section stores each of a plurality of patterns in association with a character string. The control section includes a track detecting section, a pattern determining section, and a character string display section. The track detecting section detects a track of a touch point on the touch panel by a user. The pattern determining section determines whether or not there is a match between the track of the touch point detected by the track detecting section and any of the plurality of patterns. Upon the pattern determining section determining that there is a match, the character string display section reads a character string from the storage section that is associated with a pattern determined to match the track of the touch point from among the plurality of patterns. The character string display section causes pasting and display of the character string in an input region displayed by the display section.

An image forming apparatus according to a second aspect of the present disclosure includes the display device according to the first aspect and an image forming section. The image forming section forms an image on a surface of a recording medium.

A display method according to a third aspect of the present disclosure is implemented by a display device including a display section and a storage section. The storage section stores each of a plurality of patterns in association with a character string. The display method includes detecting a track of a touch point on the display section by a user. The display method also includes determining whether or not there is a match between the track of the touch point and any of the plurality of patterns. Upon a match being determined between the track of the touch point and any of the plurality of patterns in the determining, the display method also includes reading a character string from the storage section that is associated with a pattern determined to match the track of the touch point from among the plurality of patterns, and causing pasting and display of the character string in an input region displayed by the display section.

DETAILED DESCRIPTION

Figure 1:
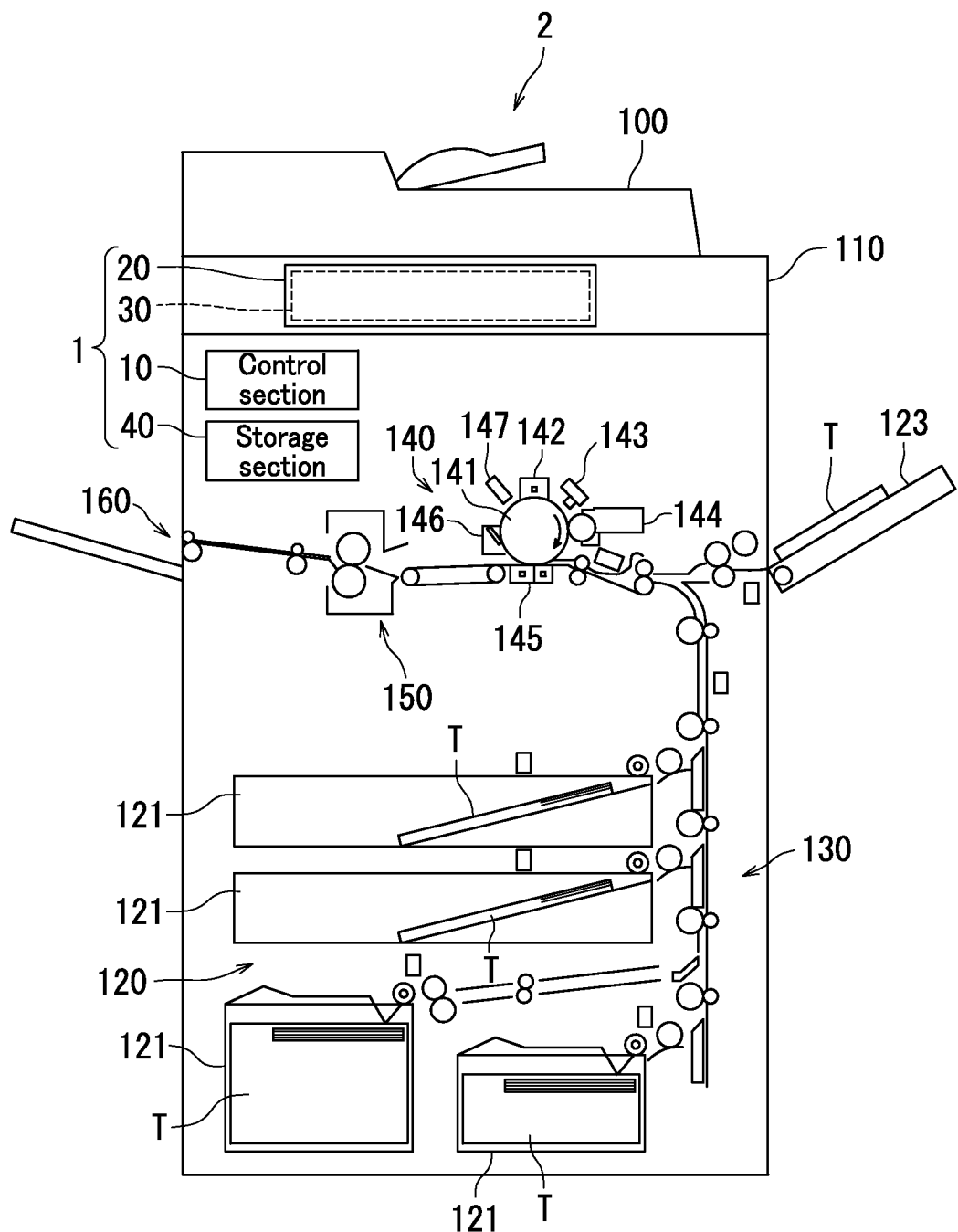
FIG. 1 illustrates an image forming apparatus according to an embodiment.

The following explains an embodiment of the present disclosure with reference to the drawings (FIGS. 1-9). Elements that are the same or equivalent are assigned the same reference signs in the drawings and are not repeatedly explained.

First, an image forming apparatus 2 according to the present embodiment is explained with reference to FIG. 1. FIG. 1 illustrates the image forming apparatus 2 according to the present embodiment. The image forming apparatus 2 is for example a scanner, a copier, a printer, a facsimile machine, or a multifunction peripheral. The multifunction peripheral has two or more functions from among, for example, a scan function, a copy function, a print function, and a facsimile function.

The image forming apparatus 2 includes a control section 10, a display section 20, a touch panel 30, a storage section 40, a document conveyance section 100, an image reading section 110, a sheet loading section 120, a sheet conveyance section 130, an image forming section 140, a fixing section 150, and an ejection section 160. A recording sheet P is conveyed in a recording sheet conveyance direction inside of the image forming apparatus 2. Note that the control section 10, the display section 20, the touch panel 30, and the storage section 40 compose a display device 1 according to the present disclosure.

The control section 10 controls overall operation of the image forming apparatus 2. More specifically, the control section 10 includes read only memory (ROM), random access memory (RAM), a central processing unit (CPU), and rewritable non-volatile memory. The ROM stores a control program. The CPU implements functions of various functional sections by reading the control program stored in the ROM and executing the control program. The CPU uses the RAM as a work area during execution of the control program. The non-volatile memory is for example flash memory or electrically erasable programmable read-only memory (EEPROM) and for example stores screen information for display by the display section 20.

The display section 20 for example includes a liquid-crystal display (LCD) and displays images such as characters, figures, and operation buttons. The touch panel 30 detects a position touched by a user. The storage section 40 includes a hard disk drive (HDD) and stores various types of information such as patterns PT and character strings. The patterns PT are explained in detail further below. Although the touch panel 30 is described as a separate element to the display section 20 in the present embodiment for the sake of convenience, the touch panel 30 may be integrated with the display section 20. In other words, the display section 20 may include the touch panel 30.

The storage section 40 for example includes a hard disk drive (HDD) and stores various types of information. The storage section 40 in the present embodiment stores each of a plurality of patterns PT in association with a character string.

The document conveyance section 100 conveys a document toward the image reading section 110. The image reading section 110 generates image data by reading an image on the document. The sheet loading section 120 is loaded with recording sheets P. The sheet loading section 120 includes cassettes 121 and a manual feed tray 123. Each of the cassettes 121 is loaded with a stack of recording sheets P. A recording sheet P is fed to the sheet conveyance section 130 from one of the cassettes 121 or the manual feed tray 123. The recording sheet P is for example plain paper, copy paper, recycled paper, thin paper, thin paper, thick paper, glossy paper, or overhead projector (OHP) film. The recording sheet P is equivalent to a "recording medium".

The sheet conveyance section 130 conveys the recording sheet P to the image forming section 140. As illustrated in FIG. 1, the image forming section 140 includes a photosensitive drum 141, a charging section 142, a light exposure section 143, a development section 144, a transfer section 145, a cleaning section 146, and a static eliminating section 147. The image forming section 140 forms an image on the recording sheet P as explained below.

The charging section 142 charges the surface of the photosensitive drum 141. The light exposure section 143 irradiates the surface of the photosensitive drum 141 with light in accordance with image data generated by the image reading section 110 or image data stored by the storage section 40. As a result, an electrostatic latent image corresponding to the image data is formed on the surface of the photosensitive drum 141.

The development section 144 develops the electrostatic latent image formed on the surface of the photosensitive drum 141 to form a toner image on the surface of the photosensitive drum 141. The transfer section 145 transfers the toner image from the photosensitive drum 141 to the recording sheet P. The cleaning section 146 removes toner remaining on the surface of the photosensitive drum 141. The static eliminating section 147 eliminates residual charge on the surface of the photosensitive drum 141.

The recording sheet P having the toner image transferred thereon is conveyed toward the fixing section 150. The fixing section 150 applies heat and pressure to the recording sheet P to fix the toner image to the recording sheet P. The recording sheet P having the image fixed thereon is conveyed toward the ejection section 160. The ejection section 160 ejects the recording sheet P.

Figure 2:
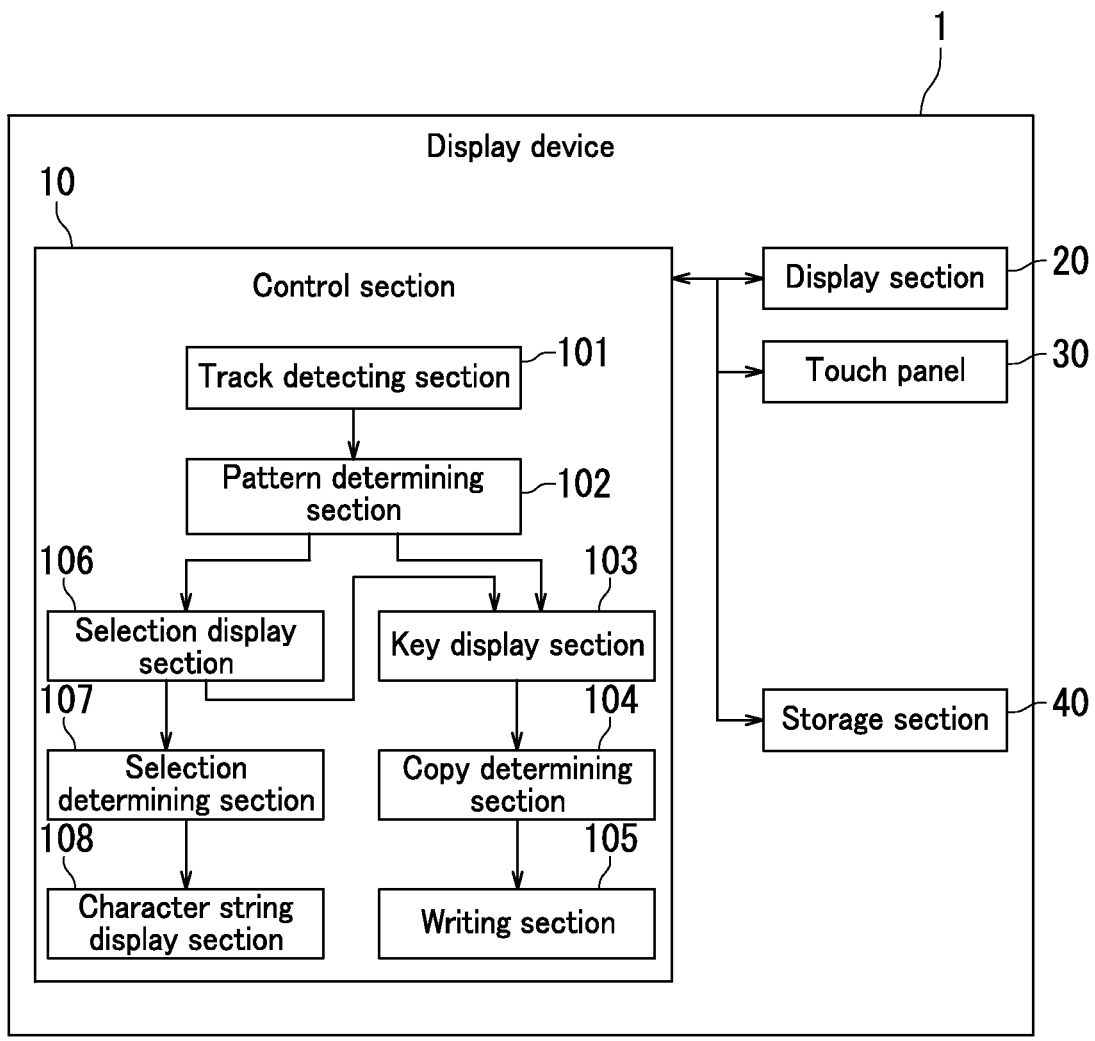
FIG. 2 is a block diagram of a display device illustrated in FIG. 1.

The display device 1 is explained next with reference to FIG. 2. FIG. 2 is a block diagram of the display device 1 illustrated in FIG. 1. As illustrated in FIG. 2, the display device 1 includes the control section 10, the display section 20, the touch panel 30, and the storage section 40. The control section 10 includes functional sections such as a track detecting section 101, a pattern determining section 102, a key display section 103, a copy determining section 104, a writing section 105, a selection display section 106, a selection determining section 107, and a character string display section 108. The CPU of the control section 10 implements functions of the aforementioned functional sections by reading the control program stored in the ROM and executing the control program.

The storage section 40 stores each of a plurality of patterns PT in association with a character string. The patterns include geometric shapes such as a circle, a triangle, and a polygon. Although the present embodiment is explained for an example in which each of the patterns PT is a geometric shape, the patterns PT may alternatively include symbols such as a plus sign, a minus sign, an equality sign, an inequality sign, or a slash, or may include characters such as alphabetical letters, Japanese katakana characters, and Japanese hiragana characters. Use of a larger number of different types of patterns PT enables the user to store a larger number of character strings in association with the patterns PT. Therefore, usability can be improved.

Figure 4:
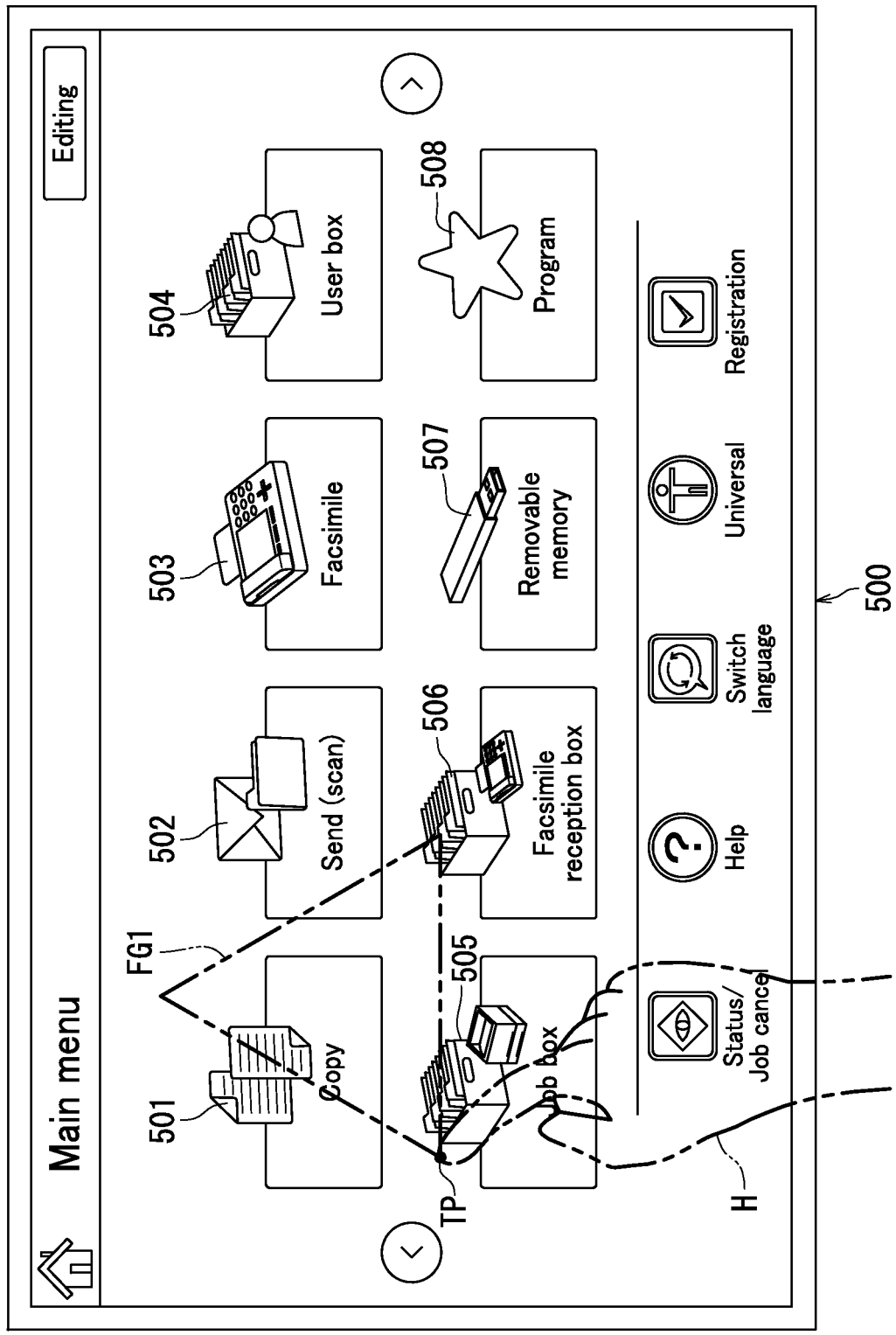
FIG. 4 is a screen diagram illustrating an example of a track input screen image displayed by a display section illustrated in FIG. 2.
Figure 7:
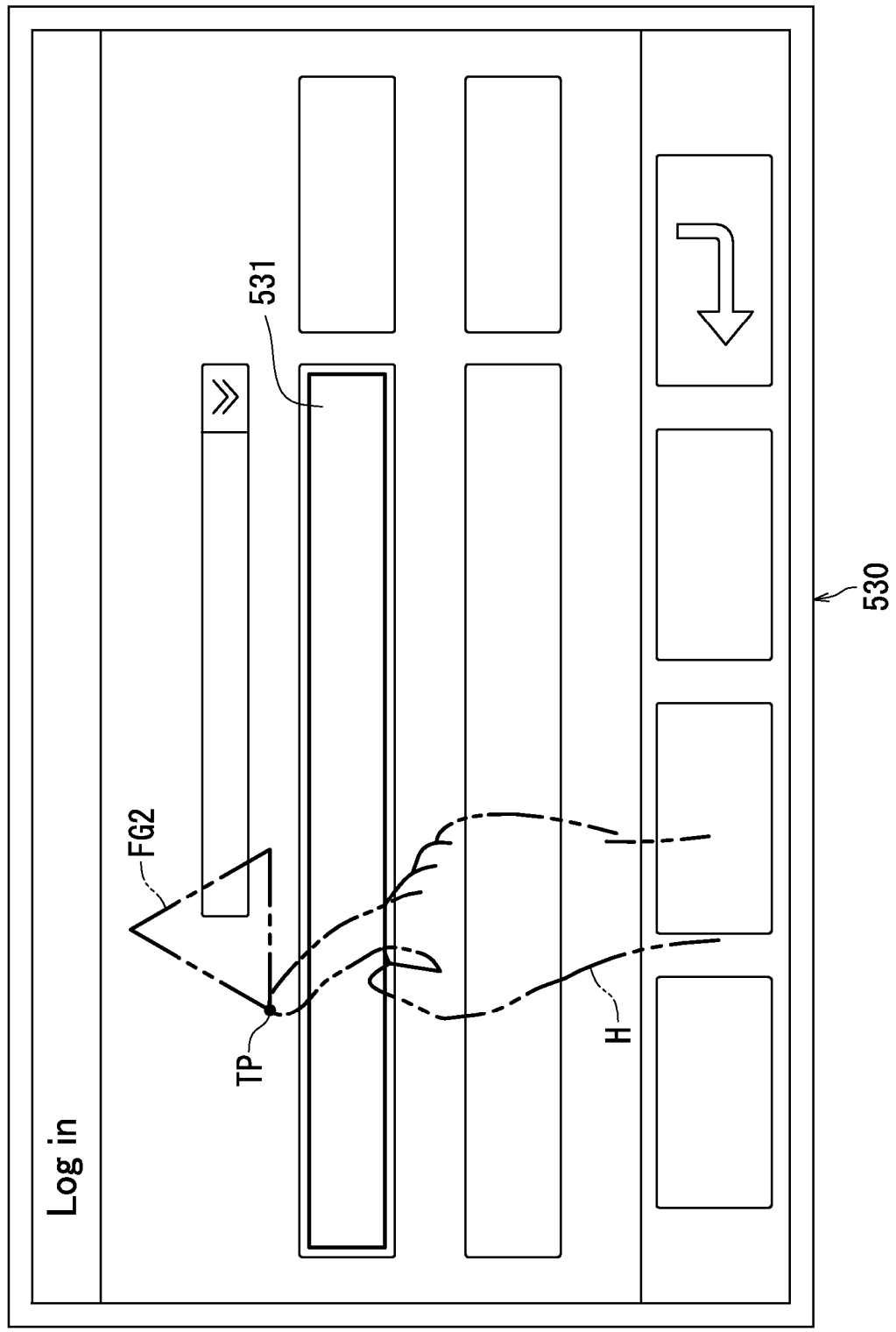
FIG. 7 is a screen diagram illustrating an example of a log in screen image displayed by the display section illustrated in FIG. 2.

The track detecting section 101 detects a track of a touch point TP on the touch panel 30 by a user (refer to FIGS. 4 and 7). The touch point TP is for example a point corresponding to a position at which the index finger of the user touches the touch panel 30. The track of the touch point TP is a line traced as the touch point TP moves. The track detecting section 101 for example detects a track of a geometric shape traced by the index finger of the user.

The pattern determining section 102 determines whether or not there is a match between the track of the touch point TP detected by the track detecting section 101 and any of the plurality of patterns PT stored by the storage section 40. More specifically, the pattern determining section 102 determines whether or not the track of the touch point TP detected by the track detecting section 101 matches any of a plurality of pre-registered geometric shapes using a known "pattern matching" technique.

Upon the pattern determining section 102 determining that the track of the touch point TP matches a pattern PT among the plurality of patterns PT stored by the storage section 40, the character string display section 108 reads a character string associated with the matching pattern PT from the storage section 40.

Furthermore, the following processing is performed upon the pattern determining section 102 determining that the track of the touch point TP does not match any of the plurality of patterns PT stored by the storage section 40. In the aforementioned processing, the pattern determining section 102 determines from among pre-registered patterns PT, which pattern PT is most similar to the track of the touch point TP detected by the track detecting section 101.

Upon the pattern determining section 102 determining that there is not a match, the key display section 103 causes the display section 20 to display soft keys SK. The key display section 103 also causes the display section 20 to display the soft keys SK upon the selection determining section 107 determining that the soft keys SK are to be displayed. The present embodiment is explained for an example in which the soft keys SK are numeric keys such as a numeric keypad (refer to FIGS. 5 and 6). The key display section 103 also causes the display section 20 to display a number display portion above the numeric keypad that displays one or more input numeric characters input via the soft keys SK and to display a copy button CB that is touched in a situation in which the numeric characters displayed in the number display portion are to be copied.

As a result of the soft keys SK being displayed by the display section 20 as described above upon the pattern determining section 102 determining that there is not a match, a character string can be input as appropriate via the soft keys SK. Therefore, usability can be improved.

As a result of the display section 20 displaying the number display portion that displays input numeric characters and the copy button CB, numeric characters displayed by the number display portion can be copied through touching of the copy button CB. Therefore, a character string (one or more numeric characters in the present embodiment) can be copied more easily.

As a result of providing the numeric keypad as the soft keys SK in the present embodiment (refer to FIGS. 5 and 6), numeric characters can be stored as a character string in the storage section 40 in association with a pattern PT. Therefore, a log in ID consisting of a plurality of numeric characters can be easily input by storing the log in ID in the storage section 40 in advance in association with a pattern PT. In addition, a number of copies can be easily set by storing the number in the storage section 40 in advance in association with a pattern PT.

Although the present embodiment is explained for an example in which the soft keys SK are numeric keys, the present example is not a limitation. In an alternative example, the soft keys SK may enable input of alphabetical letters or may enable input of Japanese kana characters and Japanese kanji characters. In an example in which the soft keys SK enable input of alphabetical characters or enable input of Japanese kana characters and Japanese kanji characters, a wide range of character strings can be stored in the storage section 40 in advance, each in association with a pattern PT. Therefore, usability can be improved.

The copy determining section 104 determines, via the touch panel 30, whether or not the copy button CB, which is caused to be displayed by the key display section 103, is touched.

Upon the copy determining section 104 determining that the copy button CB is touched, the writing section 105 performs the following processing. In the aforementioned processing, the writing section 105 writes a character string input via the soft keys SK into the storage section 40 in association with a pattern PT determined to match by the pattern determining section 102. Alternatively, the writing section 105 writes the character string input via the soft keys SK into the storage section 40 in association with a pattern PT that the pattern determining section 102 determines to be most similar among pre-registered patterns PT. Note that the character string input via the soft keys SK is one or more numeric characters displayed by the number display portion.

Through the above, the character string input via the soft keys SK is written into the storage section 40 in association with the pattern PT determined to match (or determined to be most similar) by the pattern determining section 102 upon determination that the copy button CB is touched. Therefore, usability can be further improved.

In other words, a character string associated with a pattern PT that is already stored by the storage section 40 can be changed to a different character string. In addition, a pattern PT that is not stored by the storage section 40 as one of the pre-registered patterns PT can be stored in the storage section 40 in association with a character string. Therefore, a desired character string can be written into the storage section 40 in association with a desired pattern PT, which can simplify copying operation by the user.

Upon the pattern determining section 102 determining that there is a match, the selection display section 106 causes the display section 20 to display a selection input portion SE. The selection input portion SE is an input portion for a user to select whether the soft keys SK are to be displayed by the display section 20 or whether the character string is to be pasted in an input region displayed by the display section 20. A specific example of the selection input portion SE is explained further below with reference to FIG. 8.

Through the above, the user is able to select, via the selection input portion SE, whether the soft keys SK are to be displayed by the display section 20 or whether the character string is to be pasted in the input region displayed by the display section 20. Therefore, usability can be further improved.

The selection determining section 107 determines, via the selection input portion SE, whether the soft keys SK are to be displayed or whether the character string is to be pasted in the input region displayed by the display section 20.

The character string display section 108 causes pasting and display of the character string in the input region displayed by the display section 20 only upon the selection determining section 107 determining that the character string is to be pasted.

Figure 3:
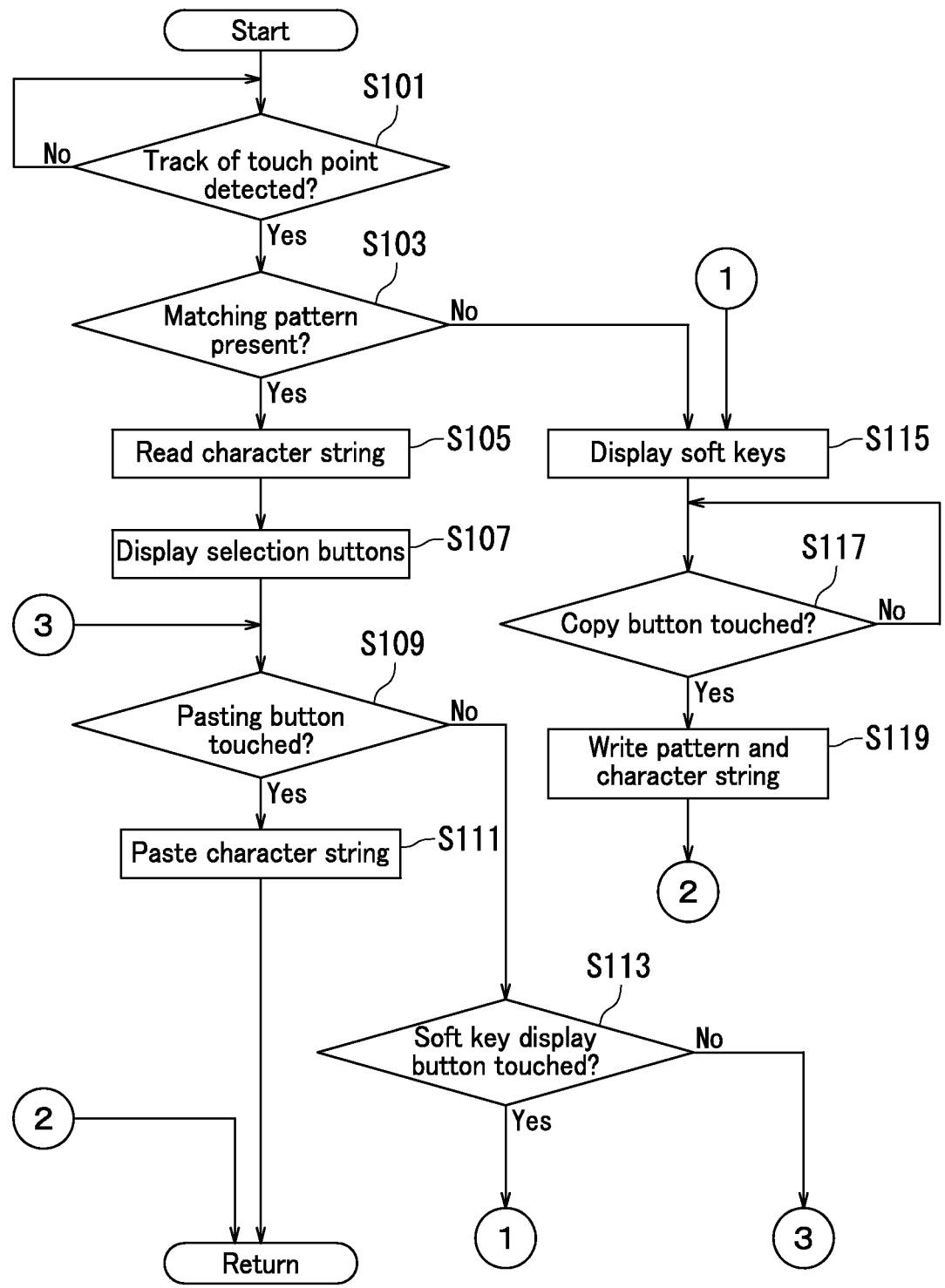
FIG. 3 is a flowchart illustrating operation of a control section illustrated in FIG. 2.

The following explains operation of the control section 10 with reference to FIG. 3. First, the track detecting section 101 determines whether or not a track of a touch point TP on the touch panel 30 by a user is detected (Step S101). Processing remains on standby when the track detecting section 101 determines that a track of a touch point TP is not detected (Step S101: No). Processing proceeds to Step S103 upon the track detecting section 101 determining that a track of a touch point TP is detected (Step S101: Yes).

Next, the pattern determining section 102 determines whether or not there is a match between the track of the touch point TP that is detected by the track detecting section 101 and any of the plurality of patterns PT stored by the storage section 40 (Step S103). Processing proceeds to Step S105 upon the pattern determining section 102 determining that a matching pattern PT is present (Step S103: Yes). On the other hand, the pattern determining section 102 performs the following processing upon determining that a matching pattern PT is not present (Step S103: No). In the aforementioned processing, the pattern determining section 102 determines from among pre-registered patterns PT, which pattern PT is most similar to the track of the touch point TP detected in Step S101. Thereafter, processing proceeds to Step S115.

Next, the character string display section 108 reads a character string from the storage section 40 that is associated with the matching pattern PT determined in Step S103 (Step S105). The selection display section 106 causes the display section 20 to display the selection input portion SE (Step S107). Note that the selection input portion SE receives input of a selection by the user of whether the soft keys SK are to be displayed by the display section 20 or whether the character string is to be pasted in the input region displayed by the display section 20.

Next, the selection determining section 107 determines, via the selection input portion SE, whether or not a selection input (referred to below as a pasting selection input) is received for pasting the character string in the input region displayed by the display section 20 (Step S109).

Processing proceeds to Step S111 upon the selection determining section 107 determining that a pasting selection input is received (Step S109: Yes). On the other hand, processing proceeds to Step S113 upon the selection determining section 107 determining that a pasting selection input is not received (Step S109: No). After the character string display section 108 causes pasting and display of the character string in the input region (input region 541 in FIG. 8) displayed by the display section 20 (Step S111), processing returns to Step S101.

Upon the selection determining section 107 making a determination of "No" in Step S109, the selection determining section 107 determines whether or not a selection input for displaying the soft keys SK is received (Step S113).

Processing proceeds to Step S115 upon the selection determining section 117 determining that a selection input for displaying the soft keys SK is received (Step S113: Yes). On the other hand, processing returns to Step S109 and steps from Step S109 onward are repeated upon the selection determining section 117 determining that a selection input for displaying the soft keys SK is not received.

The key display section 103 causes the display section 20 to display the soft keys SK (Step S115) upon a "No" determination in Step S103 or a "Yes" determination in Step S113.

Next, the copy determining section 104 determines whether or not the copy button CB is touched (Step S117). Processing remains on standby when the copy determining section 104 determines that the copy button CB is not touched (Step S117: No). On the other hand, processing proceeds to Step S119 upon the copy determining section 104 determining that the copy button CB is touched (Step S117: Yes).

After the writing section 105 writes a character string input via the soft keys SK displayed in Step S115 into the storage section 40 (Step S119), processing returns to Step S101. Note that the character string input via the soft keys SK displayed in Step S115 is written into the storage section 40 in association with the pattern PT determined to match the pattern PT indicated by the track of the touch point TP in Step S103. Alternatively, the character string input via the soft keys SK displayed in Step S115 is written into the storage section 40 in association with a pattern PT determined to be most similar to the track of the touch point TP from among the pre-registered patterns PT.

As described above, the character string associated with the pattern PT determined from among the plurality of patterns PT stored by the storage section 40 to match the track of the touch point TP is read from the storage section 40 and displayed in the input region displayed by the display section 20. Therefore, storage of the character string in the storage section 40 in advance in association with the pattern PT enables copying and pasting of the character string through a simple configuration and a simple operation.

In other words, the user can cause a character string associated with a pattern PT stored in the storage section 40 to be read and then cause the character string to be pasted and displayed in an input region displayed by the display section 20 by tracing a track corresponding to the pattern PT on the touch panel 30.

Note that Step S101 is equivalent to "detecting a track of a touch point on the display section by a user." Step S103 is equivalent to "determining whether or not there is a match between the track of the touch point and any of a plurality of patterns." Step S111 is equivalent to "reading a character string from the storage section that is associated with a pattern determined to match the track of the touch point from among the plurality of patterns, and causing the display section to paste and display the character string in an input region displayed by the display section."

The following refers to FIGS. 4-9 to specifically explain correspondence between functions of the functional sections illustrated in FIG. 2 and the flowchart illustrated in FIG. 3. The functional sections illustrated in FIG. 2 include the track detecting section 101, the pattern determining section 102, the key display section 103, the copy determining section 104, the writing section 105, the selection display section 106, the selection determining section 107, and the character string display section 108.

FIG. 4 is a screen diagram illustrating an example of a track input screen image 500 displayed by the display section 20 illustrated in FIG. 2. The track input screen image 500 is displayed by the display section 20 in Step S101 of FIG. 3 and includes button objects 501-508. A touch point TP indicated by a black circle corresponds to the position of the tip of an index finger of a hand H that is moved along a track FG1. The user traces the track FG1 on the touch panel 30 using the tip of the index finger of the hand H as illustrated in the track input screen image 500. The track FG1 is detected by the track detecting section 101. In the present embodiment, the track FG1 is triangular. Note that the touch point TP, the track FG1, and the hand H are not actually displayed by the display section 20.

Although the present embodiment is explained for an example in which the track FG1 is not displayed by the display section 20, in an alternative example, the track FG1 may be displayed by the display section 20. In a situation in which the track FG1 is displayed by the display section 20, usability can be improved because the user is easily able to visually confirm a pattern PT indicated by the track FG1.

Figure 5:
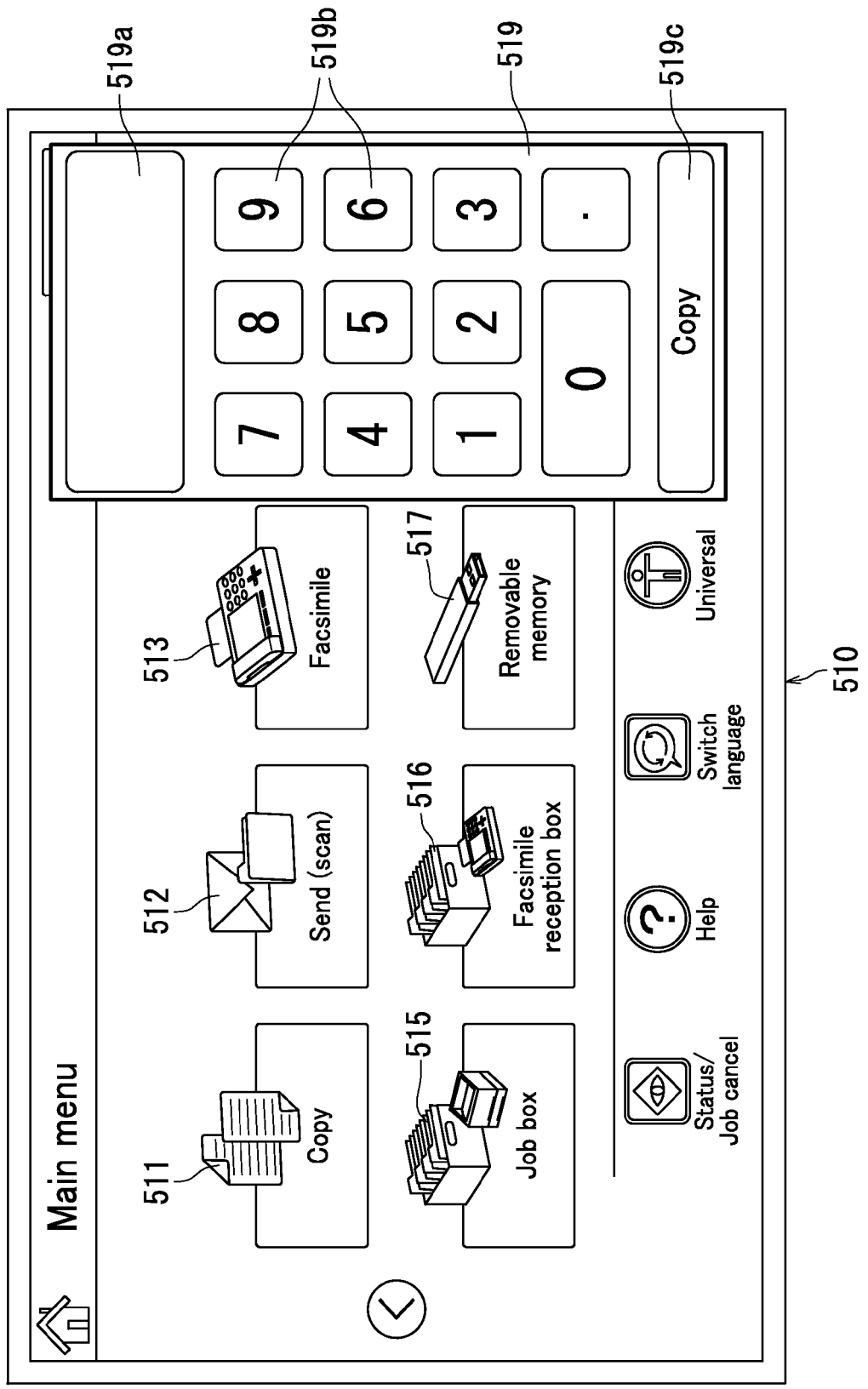
FIG. 5 is a screen diagram illustrating an example of a key display screen image displayed by the display section illustrated in FIG. 2.

FIG. 5 is a screen diagram illustrating an example of a key display screen image 510 displayed by the display section 20 illustrated in FIG. 2. The key display screen image 510 is displayed by the display section 20 in Step S115 of FIG. 3 and includes button objects 511-513 and 515-517. The key display section 103 causes a number display portion 519a, a numeric keypad 519b, and a copy button 519c to be displayed on the right side of the screen image. The numeric keypad 519b is an example of the soft keys SK. The number display portion 519a displays one or more numeric characters that are input via the numeric keypad 519b. The copy button 519c is a button that the user touches in order to copy the numeric characters displayed by the number display portion 519a.

Figure 6:
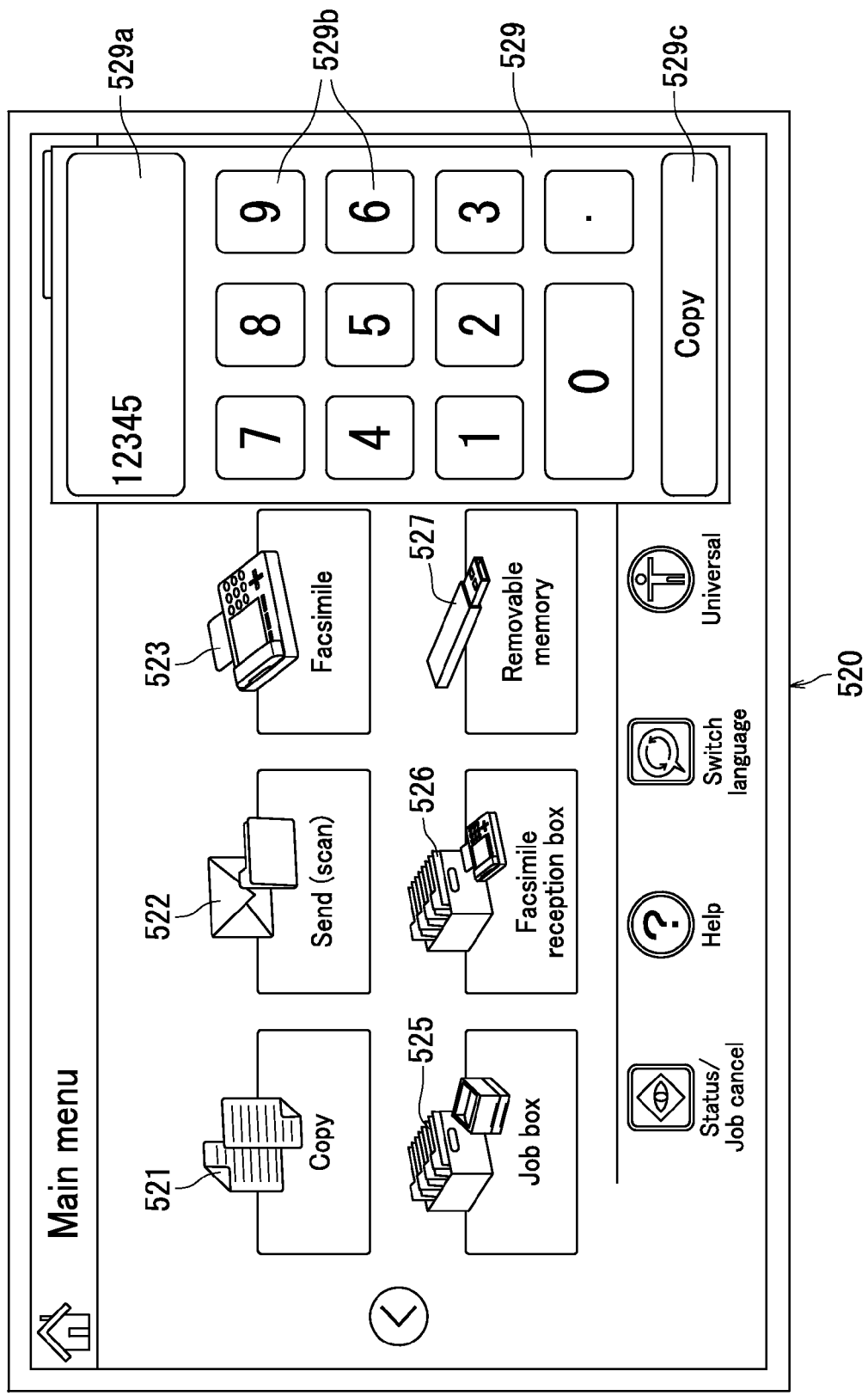
FIG. 6 is a screen diagram illustrating another example of a key display screen image displayed by the display section illustrated in FIG. 2.

FIG. 6 is a screen diagram illustrating another example of a key display screen image 520 displayed by the display section 20 illustrated in FIG. 2. The key display screen image 520 is displayed by the display section 20 in Step S115 of FIG. 3 and includes button objects 521-523 and 525-527. The key display section 103 causes a number display portion 529a, a numeric keypad 529b, and a copy button 529c to be displayed on the right side of the key display screen image 520.

The numeric keypad 529b is an example of the soft keys SK. The number display portion 529a displays one or more numeric characters input via the numeric keypad 529b. The number display portion 529a displays numeric characters "12345" as a result of the user inputting "12345" via the numeric keypad 529b. The copy button 529c is a button that the user touches in order to copy the numeric characters displayed by the number display portion 529a. The character string "12345" displayed by the number display portion 529a is copied upon the copy determining section 104 determining that the copy button 529c is touched by the user in Step S117 of FIG. 3.

In addition, in Step S119 of FIG. 3, the writing section 105 writes the character string "12345" into the storage section 40 in association with a triangular pattern PT corresponding to the track FG1 illustrated in FIG. 4.

FIG. 7 is a screen diagram illustrating an example of a log in screen image 530 displayed by the display section 20 illustrated in FIG. 2. The log in screen image 530 is displayed in Step S101 of FIG. 3 and includes an input region 531 for input of a user ID. A touch point TP indicated by a black circle corresponds to the position of the tip of an index finger of a hand H that is moved along a track FG2. The user traces the track FG2 on the touch panel 30 using the tip of the index finger of the hand H as illustrated in the log in screen image 530. The track FG2 is detected by the track detecting section 101. In the present embodiment, the track FG2 is triangular. Note that the touch point TP, the track FG2, and the hand H are not actually displayed by the display section 20.

Figure 8:
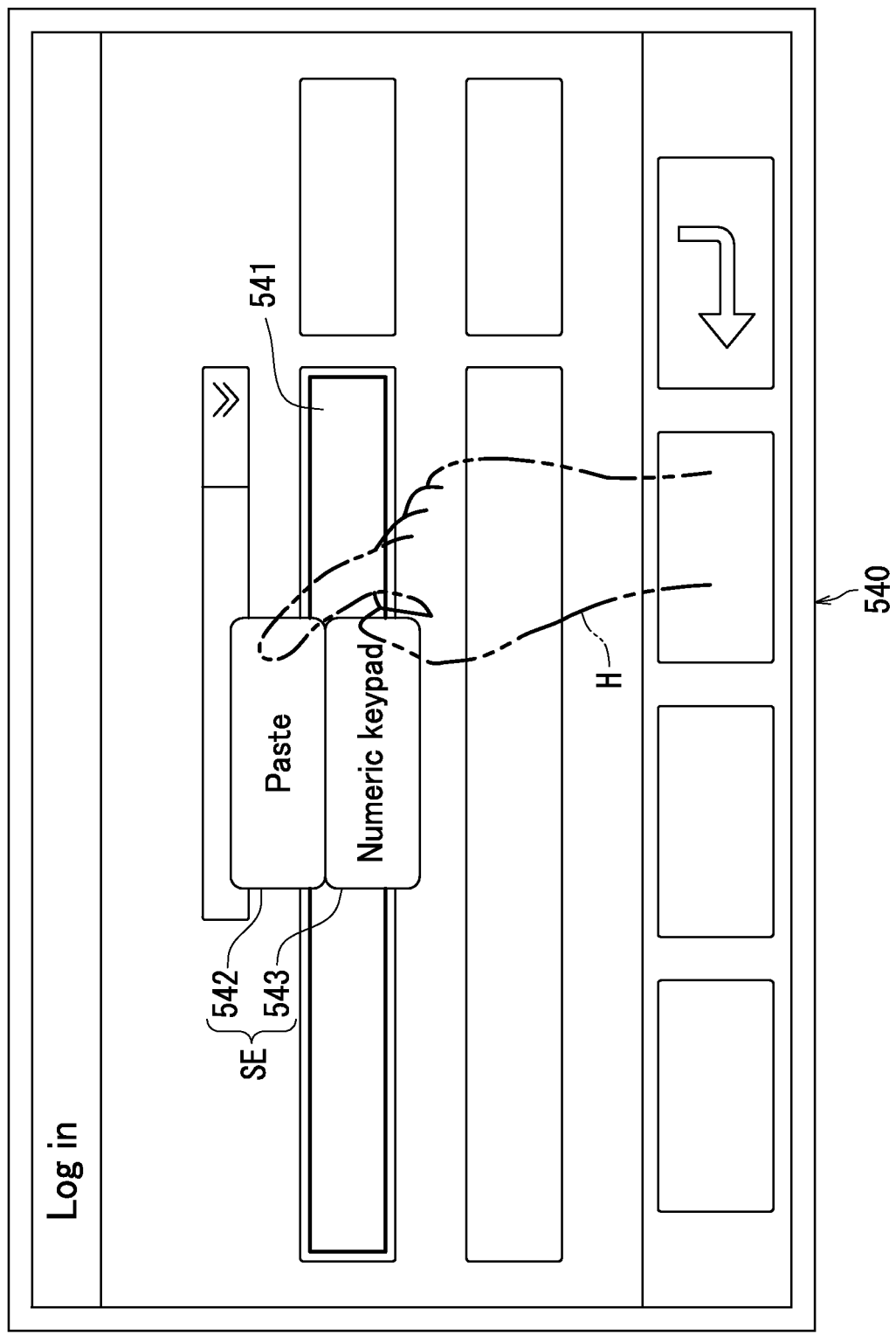
FIG. 8 is a screen diagram illustrating an example of a selection determination screen image displayed by the display section illustrated in FIG. 2.

FIG. 8 is a screen diagram illustrating an example of a selection determination screen image 540 displayed by the display section 20 illustrated in FIG. 2. The selection determination screen image 540 is displayed in Step S107 of FIG. 3 and includes an input region 541 for input of a user ID. The selection display section 106 causes display of a selection input portion SE (542 and 543). The selection input portion SE includes a paste button 542 and a numeric keypad button 543. The paste button 542 is a button that the user touches in order to paste a character string in the input region 541 displayed by the display section 20. The numeric keypad button 543 is a button that the user touches in order to cause the display section 20 to display the soft keys SK.

Figure 9:
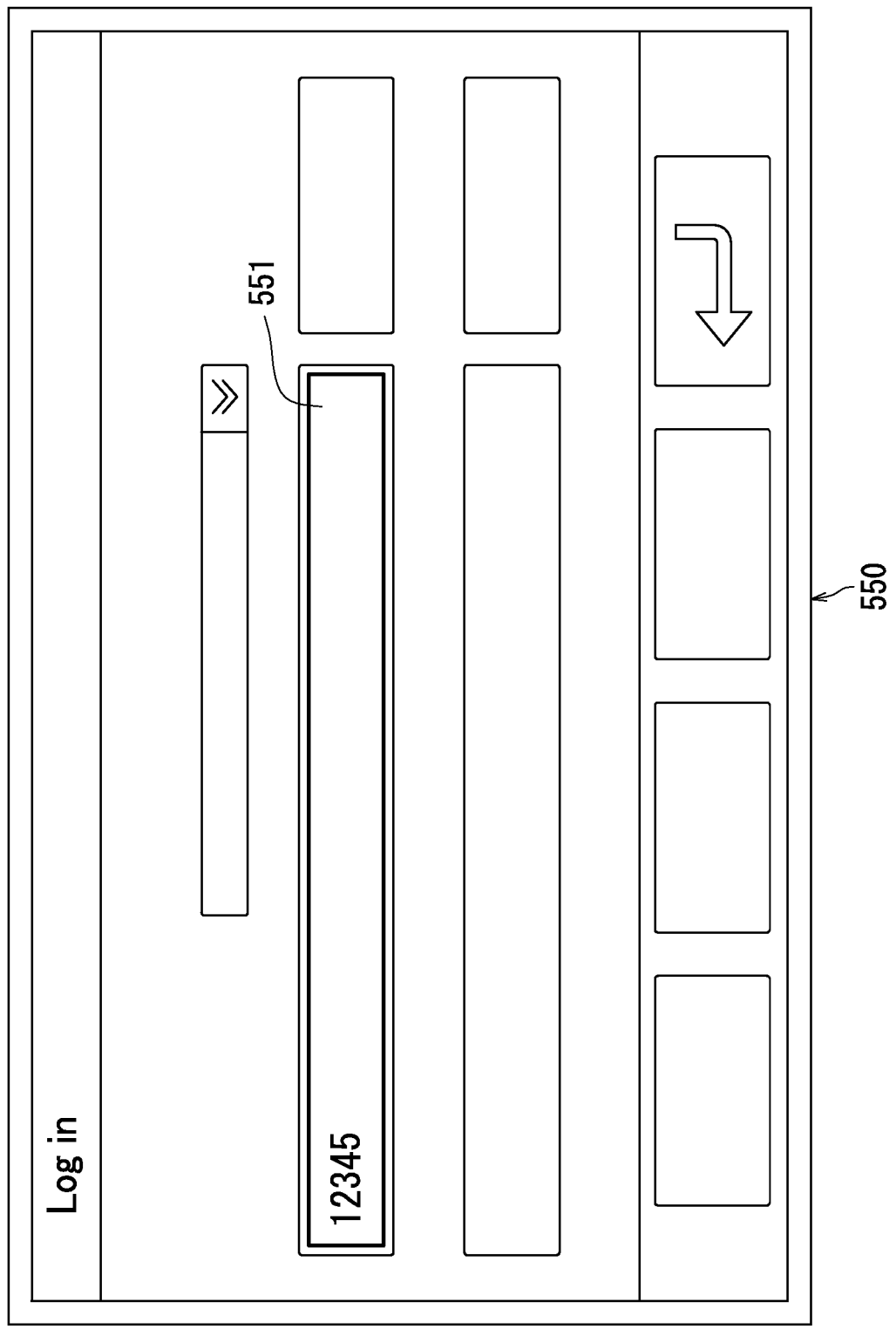
FIG. 9 is a screen diagram illustrating another example of a log in screen image displayed by the display section illustrated in FIG. 2.

Upon the paste button 542 being touched, the display section 20 displays a log in screen image 550 illustrated in FIG. 9. Upon the numeric keypad button 543 being touched, the key display section 103 causes the display section 20 to display the number display portion 519a, the numeric keypad 519b, and the copy button 519c illustrated in FIG. 5 in the selection determination screen image 540 in Step S115 of FIG. 3. Note that the hand H is not actually displayed by the display section 20.

FIG. 9 is a screen diagram illustrating another example of a log in screen image 550 displayed by the display section 20 illustrated in FIG. 2. The log in screen image 550 is displayed upon the paste button 542 being touched in the selection determination screen image 540 illustrated in FIG. 8. The log in screen image 550 includes an input region 551 for input of a user ID. As a result of the paste button 542 being touched, the character string display section 108 causes the character string "12345" displayed by the number display portion 529a illustrated in FIG. 6 to be pasted and displayed in the input region 551.

Through the above, an embodiment of the present disclosure has been described with reference to the drawings. However, the present disclosure is not limited by the above embodiment and can be implemented with various alterations that do not deviate from the essence of the present disclosure (for example, as described below in sections (1)-(5)). The drawings illustrate elements schematically in order to facilitate understanding. Furthermore, properties of elements illustrated in the drawings, such as thickness, length, and quantity, may differ from reality in order to facilitate preparation of the drawings. Also, properties of elements described in the above embodiment, such as shape and dimensions, are merely examples and are not intended to be specific limitations. Such properties may be altered without substantially deviating from the configuration of the present disclosure.

(1) Although the present embodiment is explained for an example in which the display device 1 is included in the image forming apparatus 2, in an alternative example, the display device 1 may be included in an electronic device equipped with a touch panel. For example, the display device 1 may be included in an electronic device such as a smartphone, a tablet computer, a CD player, a DVD player, or various home electronic devices.

(2) The present embodiment is explained for an example in which the pattern determining section 102 determines whether a track of a touch point TP matches any of a plurality of patterns PT stored by the storage section 40. In an alternative example, the pattern determining section 102 may further cause the display section 20 to display a pattern PT that is determined to match the track of the touch point TP. In such a situation, the user is easily able to visually confirm whether the pattern PT determined by the pattern determining section 102 matches a pattern PT which the user intended to input.

(4) Although the present embodiment is explained for an example in which the soft keys SK are displayed on the right side of a screen image as illustrated in FIGS. 5 and 6, in an alternative example, the user may be able to set a display position and size of the soft keys SK. In such a situation, usability can be further improved.

(5) Although the present embodiment is explained for an example in which the soft keys SK are numeric keys, in an alternative example, the user may be able to set the type of soft keys SK that are displayed (for example, numeric keys, symbol input keys, alphabetical letter input keys, Japanese hiragana character input keys, and Japanese katakana character input keys). In such a situation, usability can be further improved.

What is claimed is:

1. A display device comprising:
a display section including a touch panel;
a memory configured to store each of a plurality of patterns in association with a character string; and
a processor, wherein
the processor includes:
a track detecting section configured to detect a track of a touch point on the touch panel by a user;
a pattern determining section configured to determine whether or not there is a match between the track of the touch point detected by the track detecting section and any of the plurality of patterns;
a character string display section configured to, upon the pattern determining section determining that there is a match, read a character string from the memory that is associated with a pattern determined to match the track of the touch point from among the plurality of patterns, and cause pasting and display of the character string in an input region displayed by the display section;
a key display section configured to, upon the pattern determining section determining that there is not a match, cause the display section to display one or more soft keys;
a selection display section configured to, upon the pattern determining section determining that there is a match, cause the display section to display a selection input portion for the user to select whether the soft keys are to be displayed by the display section or whether the character string is to be pasted in the input region displayed by the display section; and a selection determining section configured to determine, via the selection input portion, whether the soft keys are to be displayed or whether the character string is to be pasted in the input region displayed by the display section, wherein the key display section causes the display section to display the soft keys upon the selection determining section determining that the soft keys are to be displayed, and the character string display section causes pasting and display of the character string in the input region displayed by the display section only upon the selection determining section determining that the character string is to be pasted.

2. The display device according to claim 1, wherein upon the pattern determining section determining that there is not a match, the key display section causes the display section to display a copy button that is touched in a situation in which a character string input via the soft keys is to be copied, the processor further includes:

a copy determining section configured to determine whether or not the copy button is touched; and a writing section configured to, upon the copy determining section determining that the copy button is touched, write the character string input via the soft keys into the memory, and the writing section generates a pattern corresponding to the track of the touch point detected by the track detecting section, and writes the pattern that is generated and the character string input via the soft keys into the memory in association with each other.

3. The display device according to claim 2, wherein upon the selection determining section determining that the soft keys are to be displayed, the key display section causes the display section to display the copy button that is touched in a situation in which a character string input via the soft keys is to be copied, the copy determining section determines whether or not the copy button is touched, and upon the copy determining section determining that the copy button is touched, the writing section writes the character string input via the soft keys into the memory in association with the pattern determined to match by the pattern determining section.

4. The display device according to claim 1, wherein the processor further includes a track display section configured to cause the display section to display the track of the touch point detected by the track detecting section.

5. The display device according to claim 1, wherein the processor further includes a pattern display section configured to, upon the pattern determining section determining that there is a match, cause the display section to display the pattern that is determined to match the track of the touch point from among the plurality of patterns.

6. The display device according to claim 1, wherein the soft keys include numeric keys.

7. The display device according to claim 1, wherein at least one of the plurality of patterns is a geometric shape, a symbol, an alphabetical letter, a Japanese katakana character, or a Japanese hiragana character.

8. An image forming apparatus comprising:

the display device according to claim 1;

a photosensitive drum; and a development device, the photosensitive drum and the development device being configured to form an image on a surface of a recording medium.

9. The display device according to claim 1, wherein upon the selection determining section determining that the soft keys are to be displayed, the key display section causes the display section to display a copy button that is touched in a situation in which a character string input via the soft keys is to be copied, the processor further includes:

a copy determining section configured to determine whether or not the copy button is touched; and a writing section configured to, upon the copy determining section determining that the copy button is touched, write the character string input via the soft keys into the memory, the copy determining section determines whether or not the copy button is touched, and upon the copy determining section determining that the copy button is touched, the writing section writes the character string input via the soft keys into the memory in association with the pattern determined to match by the pattern determining section.

10. A display method implemented by a display device including a display section and a memory, the display method comprising:

detecting a track of a touch point on the display section by a user;

determining whether or not there is a match between the track of the touch point and any of a plurality of patterns that are each stored in the memory in association with a character string;

upon a match being determined between the track of the touch point and any of the plurality of patterns in the determining, reading a character string from the memory that is associated with a pattern determined to match the track of the touch point from among the plurality of patterns, and causing the display section to paste and display the character string in an input region displayed by the display section;

upon determining that there is not a match in the determining, causing the display section to display one or more soft keys;

upon a match being determined between the track of the touch point and any of the plurality of patterns in the determining, causing the display section to display a selection input portion for the user to select whether the soft keys are to be displayed by the display section or whether the character string is to be pasted in the input region displayed by the display section;

determining, via the selection input portion, whether the soft keys are to be displayed or whether the character string is to be pasted in the input region displayed by the display section;

upon determining that the soft keys are to be displayed, causing the display section to display the soft keys; and only upon determining that the character string is to be pasted, causing pasting and display of the character string in the input region displayed by the display section.

* * * * *